Jan. 13, 1953
J. W. BARKER
2,625,467
APPARATUS FOR FLOWING GASES THROUGH
BEDS OF FLUENT GRANULAR SOLIDS
Filed June 27, 1949
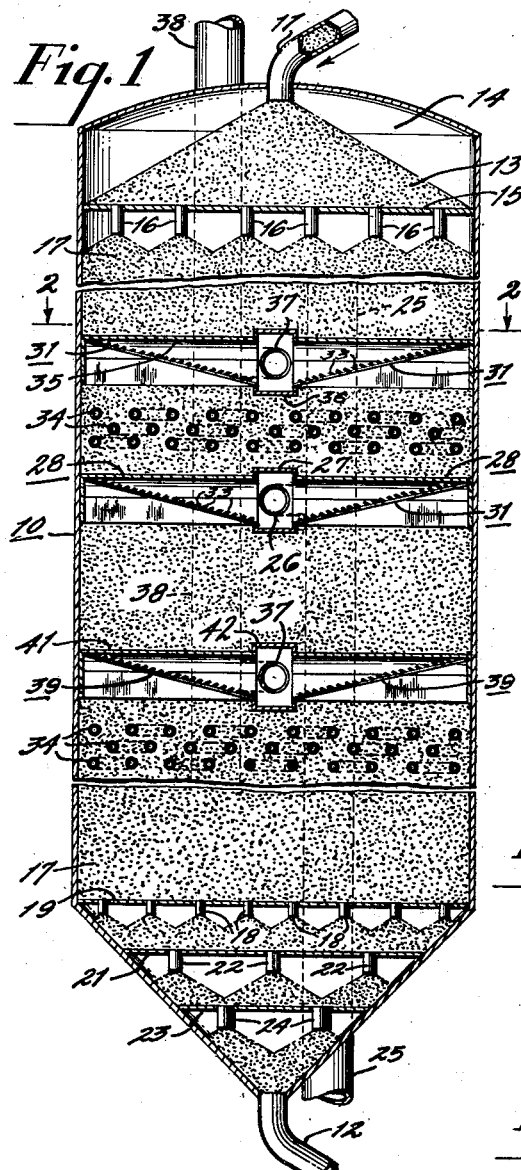
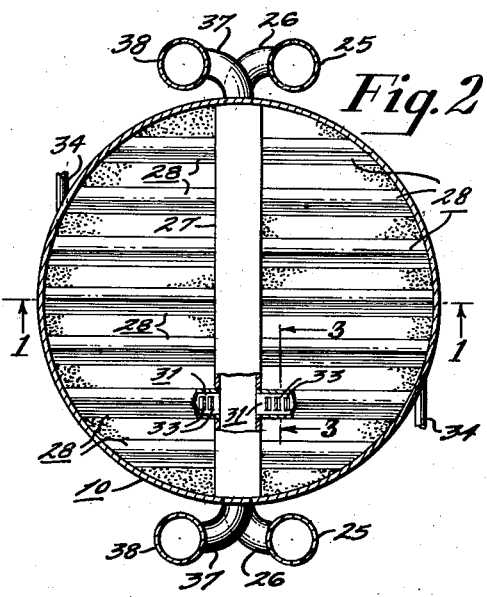
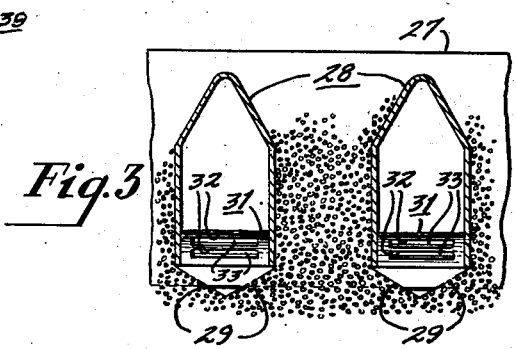
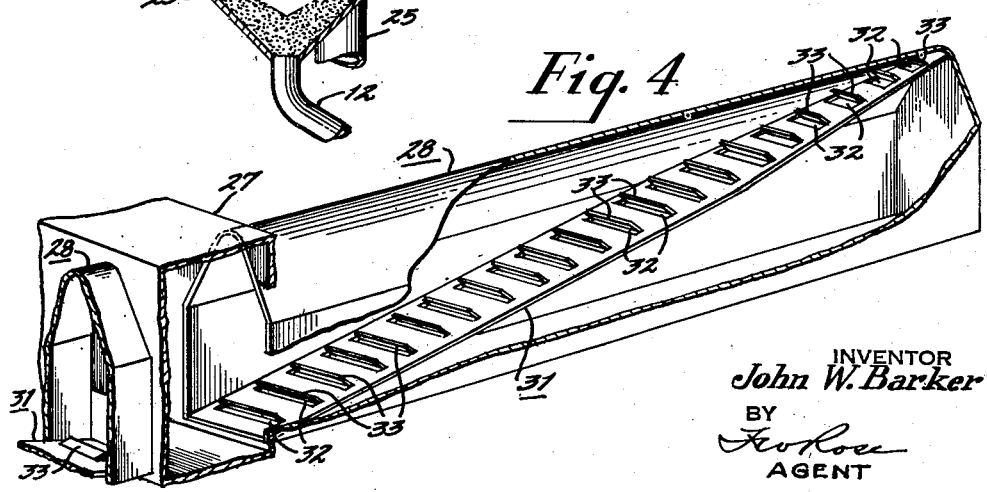
INVENTOR
John W. Barker
BY
Fro Roe
AGENT Patented Jan. 13, 1953

2,625,467

UNITED STATES PATENT OFFICE 2,625,467

APPARATUS FOR FLOWING GASES THROUGH BEDS OF FLUENT GRANULAR SOLIDS

John W. Barker, Silver Spring, Md., assignor to Houdry Process Corporation, Wilmington, Del., a corporation of Delaware Application June 27, 1949, Serial No. 101,649

5 Claims. (Cl. 23—288)

The use of moving bodies of fluent solid particles in processes that involve the contact of masses of such solid particles with fluids, as, for example, catalytic conversions of organic vapors by solid catalysts, has resulted in considerable advantages due to the continuous nature of the process but has also created problems arising from the inherent characteristics of such processes and of solid particles in such a fluent state. One such problem involving the disengagement and particularly the engagement of gas with a downwardly moving bed of fluent solid particles in a contact zone is advantageously solved by using methods and apparatus embodying the present invention. As will be described more fully below, the present invention has special advantages when applied to an exothermic operation such as the regeneration of fluent solid hydrocarbon conversion catalyst bearing a carbonaceous deposit (commonly referred to as coke) by contacting such catalyst in downwardly moving compact bed form with an oxygen containing gas under combustion conditions.

The general technique for the use of downwardly moving beds of fluent solid particles as contact masses (such particles typically being in a size range of between 1 and 20 millimeters in diameter, such as preferably between 2 to 8 millimeters) is well known. Its application to the catalytic cracking of hydrocarbons is discussed in some detail in an article entitled "The 'T. C. C.' cracking process for motor gasoline production" by R. H. Newton, G. S. Dunham and T. P. Simpson, "Transactions of the American Institute of Chemical Engineers," volume 41, page 215, April 25, 1945 (see also the articles there cited), and its application to the use of fluent inert particles for pyrolytic conversion in an article entitled "Thermofor pyrolytic cracking" by S. C. Eastwood and A. E. Potas, "Petroleum Processing," volume 3, page 837, September 1948.

In connection with such processes, one of the major practical considerations is to effect contact of process gases with the solid particles under conditions which insure uniformity of contact and equal distribution of the gases without disturbing the flow of solid particles. One effective method for achieving such contact involves the use of apparatus in which the process gas (typically the oxygen containing gas in a regeneration operation) is introduced to a chamber containing a downwardly moving non-turbulent compact bed of solid particles (typically coked catalyst) through a manifold which is centrally disposed in respect to the horizontal cross section of the chamber and of the bed (i. e., the manifold extends substantially the entire extent of a central axis of the horizontal cross section). The gas in the manifold emerges from both sides of the manifold as a plurality of streams which flow at right angles to the flow of gas in the manifold along a plurality of horizontal paths, as through conduits, spaced apart at regular intervals over the horizontal cross sectional area of the chamber and bed. Advantageously, the conduits in which the plurality of streams of gas flow are shaped so as to create free engaging surfaces of solid particles immediately therebelow in a manner described more fully below. The gas flowing in the conduits continuously enters the engaging surfaces so formed and thereafter passes through at least a portion of the bed before disengagement from the solid particles and removal from the bed. (See, for example, Patent No. 2,468,468 issued April 26, 1949 to E. L. Sinclair et al., particularly Figures 1, 2 and 3, and the article by Newton et al. cited above.)

Under the conditions described above, the horizontal streams of gas above the engaging surfaces of solid particles are continuously in contact with these surfaces. The highest velocity of the stream of gas is at the point of entrance into the conduit since all of the gas for engagement along the horizontal extent of the engaging surfaces passes through this portion of the conduit (the amount of gas in the conduit decreasing as the gas proceeds toward the end of the conduit away from the point of entrance). Frequently, such velocity creates disturbances in the engaging surface. Moreover, pressure drops may exist along the conduit which, at high rates of flow, may be sufficient to result in disproportion of the gas flowing into the bed along the conduit. Moreover, the stream of gas, when it reaches the end of the conduit, may have velocity great enough to cause a disproportionately large amount of gas to flow downwardly against the end of the conduit and through the bed near the end of the conduit. Conversely, too low a velocity results in an insufficient amount of gas or none at all reaching the end section of the conduit. When coked catalyst particles are being regenerated by oxygen containing gas, any instances of disproportionately large flow of gas result in higher temperatures of combustion with resultant damage to the catalyst and/or the apparatus, while insufficient gas results in incomplete regeneration. Somewhat similar difficulties arise when gas is removed from this type of bed by similar conduits.

In accordance with the present invention, inequalities in the flow of gas to or from a bed of this type herein desired are prevented by providing, as described more fully below, apertured partitions in the conduits for the distribution or removal of gas. Such partitions may have associated therewith, but not necessarily, gas deflecting means. In either event, each of such partitions slopes upwardly from the end of the conduit at which introduction or removal of the stream of gas is effected and hence, when used for the introduction of gas, in the direction of flow of the gas. Such partitions form an effective means for passing downwardly metered amounts of the total gas flowing in the path defined by each of said conduits, thus preventing contact of the engaging surfaces with any gas except that passing directly through surfaces and also minimizing any horizontal velocity component in the gas at the end of the conduit.

The methods and apparatus involved in the present invention are set forth in detail below in connection with the description of the drawings in which a preferred embodiment of the present invention is shown. This embodiment will be described in terms of a process for the regeneration of coked particles of hydrocarbon cracking catalyst by oxygen containing gas, but it is to be understood that such description is to be regarded as illustrating the invention rather than restricting its scope since those skilled in the art will thereby understand how to apply the invention to other operations or processes.

In the drawings:

Figure 1 is an elevational view, in section of a vessel, regenerator or kiln containing a moving bed of solid particles contacted by gases;

Figure 2 is a horizontal section of the vessel, taken along the lines 2—2 of Figure 1, and showing the relationship of the parts of the apparatus at this level;

Figure 3 is an enlarged view of a portion of a manifold and two conduits employed in connection with the invention, this view being taken along the lines 3—3 of Figure 2;

Figure 4 is an isometric view of a conduit connected to the manifold and containing a louvered partition.

Shown in Figure 1 is a housing, vessel, regenerator or kiln, indicated generally at 10 to which coked catalyst from a hydrocarbon conversion reactor (not shown) is introduced by conduit 11, completely regenerated catalyst being removed from the kiln by conduit 12. The particles of catalyst introduced by conduit 11 form a bed 13 in storage chamber 14, which bed rests on a partition or plate 15. The catalyst from bed 13 moves downwardly through catalyst distribution conduits or nipples 16, which conduits are arranged and disposed in plate 15 so as to distribute evenly the catalyst particles over the surface of bed 17. The catalyst in bed 17 moves downwardly through the kiln through a plurality or multiplicity of regeneration stages (only one of which is shown in Figure 1) and thereafter is discharged from the bottom of bed 17 through a plurality of catalyst withdrawal conduits or nipples 18 distributed or placed evenly over partition or plate 19. Plate 19 forms the bottom of the regeneration chamber containing the bed of catalyst, the top of the regeneration chamber being coincident with plate 15. The catalyst after passage through conduits 18 passes through two plates 21 and 23 and through associated conduits 22 and 24, the conduits of each set being in staggered relationship and fewer in number than those in the plate above. Plates 19, 21 and 23 and the associated conduits comprise a catalyst withdrawal device or means well known to the art (see, for example, U. S. Patent No. 2,412,136 issued on December 3, 1946, to L. P. Evans et al.).

As stated above and as is well known, the regeneration of the coked catalyst may be effected in a series of regeneration stages as a multiple stage process. A typical single stage of such a multiple stage process is shown in Figure 1. Oxygen containing gas, such as air, air fortified with oxygen, partially spent flue gas and the like, is introduced from one or more stacks or manifolds 25 by conduits 26 to the ends of a hollow beam or manifold 27, which manifold extends in a horizontal direction along the complete extent of a central axis of the horizontal cross section of the bed or kiln. Affixed to and in vapor communication with manifold 27, are a plurality of conduits, indicated generally at 28, which are spaced apart at regular intervals over the horizontal cross sectional area of the bed and which extend on both sides of the manifold to a boundary of the bed. Conduits 28 form means for distributing the oxygen containing gas uniformly over the bed and define paths or gas distribution chambers for the travel and distribution of portions of the total gas in manifold 27, which paths are free of solid particles.

As shown particularly in Figure 3, conduits 28 have pointed or gable shaped tops and straight vertical sides of appreciable vertical height. Because of the shape and positioning of conduits 28, the solid particles travel generally vertically downwardly in lines of flow which start to diverge, in respect to the center line of any channel, at the apex of the gable shaped tops, then are straight between the opposing faces formed by the sides of adjacent conduits and then converge and form free engaging surfaces 29, which engaging surfaces are immediately below the conduits and hence immediately below the gas distribution chambers or paths defined by conduits 28.

In accordance with the present invention, a louvered or apertured partition, indicated generally at 31, is placed in conduit 28 so as to slope upwardly in the direction of flow of the oxygen containing gas. The partition has openings, apertures or ports 32 which may be of such an area that equal amounts of gas enter the engaging surface served by each port. The engaging surface served by a particular port is considered to be the surface below the conduit from the midpoint of the distance to the adjacent port on one side to the midpoint of the distance to the port on the other side of the port considered. The ports, however, may have unequal areas, such as where it is desired to flow less gas through the portion of the bed adjacent to the wall of the housing and thus maintain a lower temperature at the wall of the chamber. In either event, a metered amount of gas passes downwardly through the ports. Associated with ports 32 are deflectors 33 which are inclined at an angle so as to deflect the horizontally traveling gas vertically downward through ports 32.

In the embodiment shown in Figure 1, a portion of the oxygen containing gas that passes through engaging surfaces 29 thereafter flows upwardly through the portion of the bed above conduits 28 under combustion conditions. This portion of the bed contains cooling coils 34. An indirect heat transfer medium of known composition, such as water, molten inorganic salts, mercury and the like is circulated through coils 34 so as to remove at least a portion of the heat of combustion. The flue gas formed by the oxygen containing gas traveling upwardly is removed by conduits 35, manifold 36, conduit 37 and stack 38 these elements being similar in construction to conduits 28, manifold 27, conduit 26 and stack 25, respectively. Conduits 35 may be equipped with louvered partitions 39, which are similar to louvered partition 31. Another portion of the oxygen containing gas that passes through engaging surfaces 29 thereafter flows downwardly through the portion of the bed below conduits 28 under combustion conditions, the resulting flue gases being removed from the kiln by conduits 41 and manifold 42 and thereafter passing to stack 38. Conduits 41 may be equipped with a louvered partition 39 similar to partitions 31. In a multistage regenerator, the flue gases in conduits 35 and 41 will be not only those described above but also flue gases from oxygen containing gas introduced below and above, respectively, these conduits by conduits (not shown) of the stages below and above the stage shown. The conduits not shown may be similar in construction and use to conduit 28 and placed below and above conduits 35 and 41, respectively. The arrangement of conduits described above may be repeated as many times as desirable. However, a single stage regeneration process may be effected using the methods and apparatus of the present invention.

It is to be understood that alternative methods of introducing the oxygen containing gas may be used. Thus, the kiln may be square or rectangular in horizontal cross section and manifold 27 placed outside, as on two sides. In such a case the louvered partition, which extends from the end of conduit 28 adjacent to manifold 27 to the opposite end of conduit 28 in the drawings, may be double, each partition extending from the point of introduction of the oxygen containing gas to the mid-point of the conduit. Also, if desired, the louvered partition may start at some level above the bottom of the walls of conduit 28, such as at the mid-point. When the bottom of the louvered partition is so positioned, a vertical partition, extending from the bottom of the partition to the bottom of the walls of the conduit is placed in conduit 28 so as to prevent flow of gas except through the partition.

In another modification, the kiln may have a circular cross section and the channels or conduits, through which pass gases to be introduced or removed from the bed of solid particles and which contain louvered partitions as herein described, may extend outwardly from a central duct to the boundary of the bed in a star-like fashion.

Also, it is to be understood that, when deflectors 33 are used, they may be placed as shown in the drawings or at any desired position between adjacent apertures so that they effect their function. Thus, the deflectors may be below rather than above partition 31 and on the near side (in respect to the manifold) of the apertures rather than on the far side (as shown in the drawings).

Obviously many modifications and variations of the invention as hereinbefore set forth may be made without departing from the spirit and scope thereof and therefore only such limitations should be imposed as are indicated in the appended claims.

I claim as my invention:

1. In apparatus for contacting downwardly moving fluent solid particles with gases, said apparatus comprising a housing adapted to confine a bed of said particles; a device defining particle free paths for gas comprising a manifold extending substantially the entire extent of a central axis of the horizontal cross section of said housing, a plurality of conduits in gaseous communication with and spaced along the horizontal extent of said manifold, said conduits extending in a horizontal direction normal to said manifold to substantially the periphery of said housing, said conduits being open at the bottom and defining a gas containing chamber having an appreciable vertical height, and apertured partitions in each of said conduits, said partitions sloping upwardly from the ends of said conduits adjacent to said manifold.

2. An apparatus for contacting fluent solid particles moving downwardly with gases, said apparatus comprising a housing for confining a bed of said particles, a gas distribution device comprising a gas manifold extending substantially the entire extent of a central axis of the horizontal cross section of said housing, a plurality of gas distribution conduits in gaseous communication with and spaced at regular intervals along the horizontal extent of said manifold, said conduits extending in a horizontal direction normal to said manifold to substantially the periphery of said housing, said conduits having gable shaped tops and straight vertical sides so as to define a vapor distribution chamber and louvered plates in each of said conduits extending diagonally from substantially the bottom of the end of the conduit adjacent the manifold to the top of the opposite end of said conduit.

3. An apparatus for contacting downwardly moving fluent solid particles with gas, said apparatus comprising a housing for confining a bed of said particles, a gas manifold, a plurality of horizontally elongated conduits in gaseous communication with said manifold and spaced from each other over substantially the full extent of a horizontal cross sectional area of said bed, said conduits being open at the bottom and defining a gas containing chamber having an appreciable vertical height, and apertured partitions in each of said conduits, said partitions sloping upwardly from the ends of said conduits adjacent to said manifold.

4. Apparatus as defined in claim 3 in which said apertured partitions are coextensive with said conduits.

5. Apparatus as defined in claim 3 in which the apertured edges farthest from said manifold are provided with deflector members constructed and arranged to provide a substantially horizontal flow of gas in the portion of said conduit above said partition and a substantially vertical flow of gas in the portion below said partition.

JOHN W. BARKER.

REFERENCES CITED

The following references are of record in the file of this patent:

UNITED STATES PATENTS

| Number | Name | Date |
| --- | --- | --- |
| 2,429,721 | Jahnig | Oct. 28, 1947 |
| 2,440,475 | Jacomini | Apr. 27, 1948 |
| 2,458,358 | Evans | Jan. 4, 1949 |
| 2,458,411 | Payne | Jan. 4, 1949 |
| 2,458,434 | Simpson | Jan. 4, 1949 |
| 2,458,435 | Simpson | Jan. 4, 1949 |
| 2,485,487 | Crowley | Jan. 4, 1949 |
| 2,495,786 | Strader | Jan. 31, 1950 |